(12) United States Patent
Dabak et al.

(10) Patent No.: US 12,196,587 B2
(45) Date of Patent: *Jan. 14, 2025

(54) GAS VOLUME DETERMINATION IN FLUID

(71) Applicant: TEXAS INSTRUMENTS INCORPORATED, Dallas, TX (US)

(72) Inventors: Anand Dabak, Plano, TX (US); Srinivas Lingam, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,463

(22) Filed: Aug. 14, 2023

(65) Prior Publication Data

US 2023/0400336 A1 Dec. 14, 2023

Related U.S. Application Data

(63) Continuation of application No. 16/883,320, filed on May 26, 2020, now Pat. No. 11,725,967.

(60) Provisional application No. 62/853,994, filed on May 29, 2019.

(51) Int. Cl.
| | | |
|---|---|---|
| *G01F 1/66* | (2022.01) |
| *G01F 1/667* | (2022.01) |
| *G01F 1/7082* | (2022.01) |
| *G01N 29/02* | (2006.01) |
| *G01N 29/024* | (2006.01) |
| *G01N 29/36* | (2006.01) |
| *G01N 29/44* | (2006.01) |
| *G01F 1/712* | (2006.01) |
| *G01F 1/74* | (2006.01) |

(52) U.S. Cl.
CPC ................ *G01F 1/66* (2013.01); *G01F 1/662* (2013.01); *G01F 1/667* (2013.01); *G01F 1/7082* (2013.01); *G01N 29/02* (2013.01); *G01N 29/024* (2013.01); *G01N 29/36* (2013.01); *G01N 29/44* (2013.01); *G01N 29/4454* (2013.01); *G01F 1/712* (2013.01); *G01F 1/74* (2013.01)

(58) Field of Classification Search
CPC . G01F 1/66; G01F 1/667; G01F 1/662; G01F 1/74; G01N 29/36; G01N 29/02; G01N 29/024; G01N 29/4454; G01N 29/44
See application file for complete search history.

(56) References Cited

U.S. PATENT DOCUMENTS

| | | |
|---|---|---|
| 2002/0124661 A1 | 9/2002 | Wagner |
| 2009/0025460 A1 | 1/2009 | Hurmuzlu |
| 2010/0154562 A1 | 6/2010 | Fukuhara |
| 2012/0055239 A1 | 3/2012 | Sinha |
| 2013/0238260 A1 | 9/2013 | Fukuhara |

*Primary Examiner* — Benjamin R Schmitt
(74) *Attorney, Agent, or Firm* — Xianghui Huang; Frank D. Cimino

(57) ABSTRACT

An integrated circuit includes one or more central processing unit (CPU) cores configured to cause a first ultrasonic transducer to generate ultrasonic signals into a fluid moving in a pipe and the first or a second ultrasonic transducer to receive the ultrasonic signals from the fluid. The CPU core(s) also compute a first value indicative of at least one of a standard deviation and a time correlation based on the received ultrasonic signals. The CPU core(s) further determine a second value indicative of a volume of gas bubbles in the fluid using the computed first value indicative of the at least one of the standard deviation and time correlation.

19 Claims, 5 Drawing Sheets

GAS VOLUME DETERMINATION IN FLUID

CROSS-REFERENCE TO RELATED APPLICATIONS

This application is a continuation application of U.S. patent application Ser. No. 16/883,320 filed May 26, 2020 (now U.S. Pat. No. 11,725,967), which claims priority to U.S. Provisional Application No. 62/853,994, filed May 29, 2019, each of which is hereby incorporated by reference.

BACKGROUND

Flowmeters are used to measure fluid flow through a pipe. Some flowmeters use ultrasonic transducers in which an ultrasonic signal is injected into the fluid flow in the downstream direction of fluid flow between two ultrasonic transducers and the absolute time-of-flight (TOF) is determined in the downstream direction. Another ultrasonic signal is injected in the upstream direction and the absolute TOF between the transducers in that direction is also determined. The difference in the TOFs between the upstream and downstream direction can be used to compute the velocity of the fluid flow and, with knowledge of the cross-sectional area of the pipe, the flow rate.

SUMMARY

In one example, a computer-readable storage device stores machine instructions which, when executed by one or more central processing unit (CPU) cores, causes the one or more CPU cores to cause a first ultrasonic transducer to generate ultrasonic signals into a fluid moving in a pipe and the first or a second ultrasonic transducer to receive the ultrasonic signals from the fluid. The CPU core(s) are further causes to compute a first value indicative of at least one of a standard deviation and a time correlation based on the received ultrasonic signals, and compute a second value indicative of a volume of gas bubbles in the fluid using the computed first value indicative of the at least one of the standard deviation and time correlation.

In another example, an integrated circuit includes one or more central processing unit (CPU) cores configured to cause a first ultrasonic transducer to generate ultrasonic signals into a fluid moving in a pipe and the first or a second ultrasonic transducer to receive the ultrasonic signals from the fluid. The CPU core(s) also compute a first value indicative of at least one of a standard deviation and a time correlation based on the received ultrasonic signals. The CPU core(s) further compute a second value indicative of a volume of gas bubbles in the fluid using the computed first value indicative of the at least one of the standard deviation and time correlation.

In yet another example, a method includes making flowrate measurements of a fluid and storing a value indicative of each flowrate measurement in storage. The method further includes computing a first value indicative of at least one of a standard deviation and a time correlation based on the received ultrasonic signals, and computing a second value indicative of a volume of gas bubbles in the fluid using the computed first value indicative of the at least one of the standard deviation and time correlation.

BRIEF DESCRIPTION OF THE DRAWINGS

For a detailed description of various examples, reference will now be made to the accompanying drawings in which.

DETAILED DESCRIPTION

A fluid, whose rate is being measured by a flowmeter, may contain gas bubbles. In one example, the gas is air, but can be others type of gas as well. It may be desirable in some applications to have an indication of the volume of gas bubbles within the fluid. That is, it may be desirable to determine the flow rate and the volume of gas bubbles within the fluid (e.g., the volume of gas bubbles per unit volume of fluid). Some examples described herein are directed to systems (e.g., flowmeters) that determines flow rate and the volume of gas bubbles.

Figure 1:
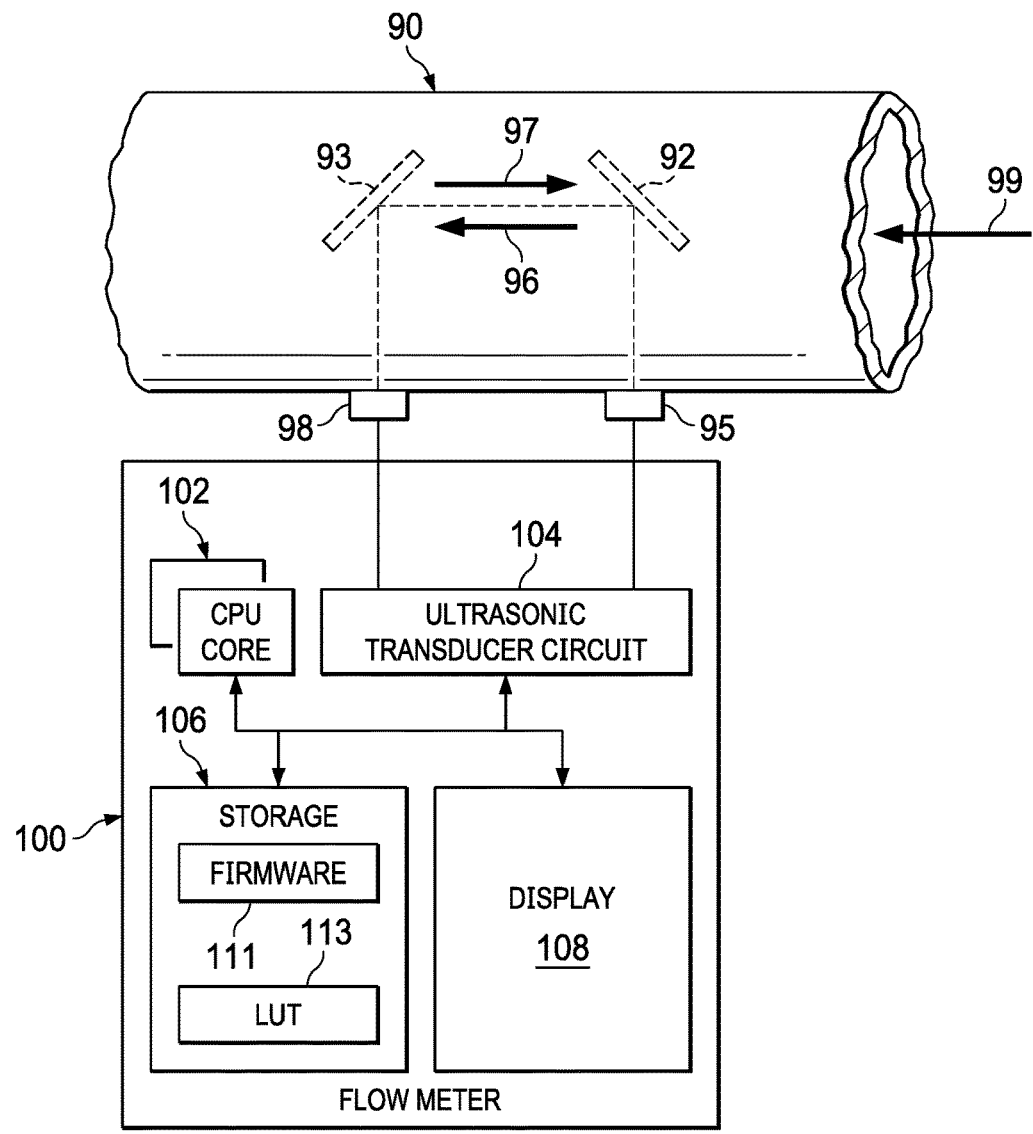
FIG. 1 illustrates a flowmeter in accordance with one example.

FIG. 1 shows an example of a flowmeter 100. The example flowmeter 100 includes one or more central processing unit (CPU) cores 102, an ultrasonic transducer (UST) circuit 104, storage 106, and a display 108. The term "CPU core" (singular) is used herein to refer to either a single CPU core or multiple CPU cores. In one implementation, the flowmeter 100 comprises a microcontroller unit (MCU) fabricated as an integrated circuit on a common semiconductor substrate. The flowmeter 100 also includes or couples to ultrasonic transducers 95 and 98, which are shown coupled to a pipe 90 in which a fluid flows in the direction of arrow 99. A pair of ultrasonic signal reflectors 92 and 93 are included in the pipe in this example. The UST circuit 104 can provide an electrical signal to either of transducers 95 or 98 and monitor the resulting signal from the other transducer. For example, transducer 95 can convert an electrical signal from the UST circuit 104 into an ultrasonic signal injected into the fluid flow in pipe 90. The ultrasonic signal reflects off reflector 92 and then reflector 93 as indicated by arrow 96 (in the downstream direction). The ultrasonic signal then is received by transducer 98 and converted back into an electrical signal and provided to UST circuit 104. Additionally or alternatively, the UST circuit 104 can use transducer 98 as the transmitting transducer and transducer 95 as the receiving transducer thereby causing an ultrasonic signal to pass through the fluid in the direction of arrow 97 (in the upstream direction). In some implementations, the pipe 90 does not include reflectors 92 and 93.

The UST circuit 104 measures the time it takes for the ultrasonic signal to pass through the fluid flow from one transducer to another. With no fluid flow relative to the transducers 95, 98, the speed of an ultrasonic signal in the fluid is a function of the type of fluid in pipe 90. Time is distance/velocity, and thus the time required for an ultrasonic signal to pass in the downstream direction (i.e., from transducer 95, through the fluid, and to transducer 98) is L/(c+v) where L is the combined distance from transducer 95 to reflector 92 to reflector 93 and to transducer 98 and is a known value, c is the speed of ultrasound with respect to the fluid being monitored, and v is the speed of the fluid flow in direction 99. In the upstream direction (i.e., from transducer 98 to transducer 95), the time required for an ultrasonic signal to pass from transducer 98 to transducer 95 is L/(c−v). The difference in the time values is ΔT and the velocity of the fluid is:

$$v = \frac{L}{2}\left(\frac{\Delta T}{T1 * T2}\right) \tag{1}$$

where T1 is the measured time from transducer 95 to transducer 98, and T2 is the measured time from transducer 98 to transducer 95. Thus, by measuring T1 and T2 using the UST circuit 104, the velocity of the fluid flow can be calculated. The cross-sectional area of pipe 90 also is known and the volume of the interior of the pipe between transducers 95 and 98 can be calculated and known apriori. Assuming the pipe is full of fluid, the fluid flow rate can be determined based on the calculated velocity. The storage 106 comprises volatile or non-volatile memory (non-transitory computer-readable storage device) and includes firmware (machine instructions) 111. The firmware 111 is executable by one or more of the CPU cores 102. Upon execution of the firmware 111, the CPU core 102 interact with the UST circuit 104 to determine the flowrate of fluid in pipe 90.

Figure 2:
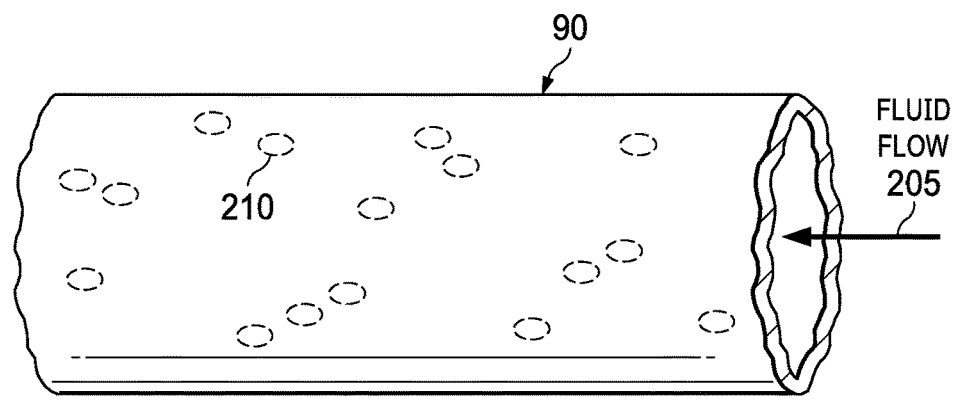
FIG. 2 illustrates a fluid with gas bubbles flowing through a pipe.

FIG. 2 illustrates pipe 90 with fluid flowing through the pipe in the direction of arrow 205. Fluid also illustrates that gas bubbles 210 may be present in the fluid. Storage 106 is also used to store transducer values for analysis by CPU core 102, as explained below, to determine the volume of gas bubbles in the fluid. If the size of the gas bubbles is smaller than the wavelength of the ultrasound signals produced by the transducers, the flowmeter 100 may still be able to determine flowrate with sufficient accuracy. However, it may be desirable to know the amount of the gas bubbles 210 within the fluid, for example, the total volume of the gas bubbles per unit volume of fluid. Larger bubbles will result in a larger volume of the gas within the fluid and may detrimentally affect the accuracy of the fluid flow measurements.

Figure 3:
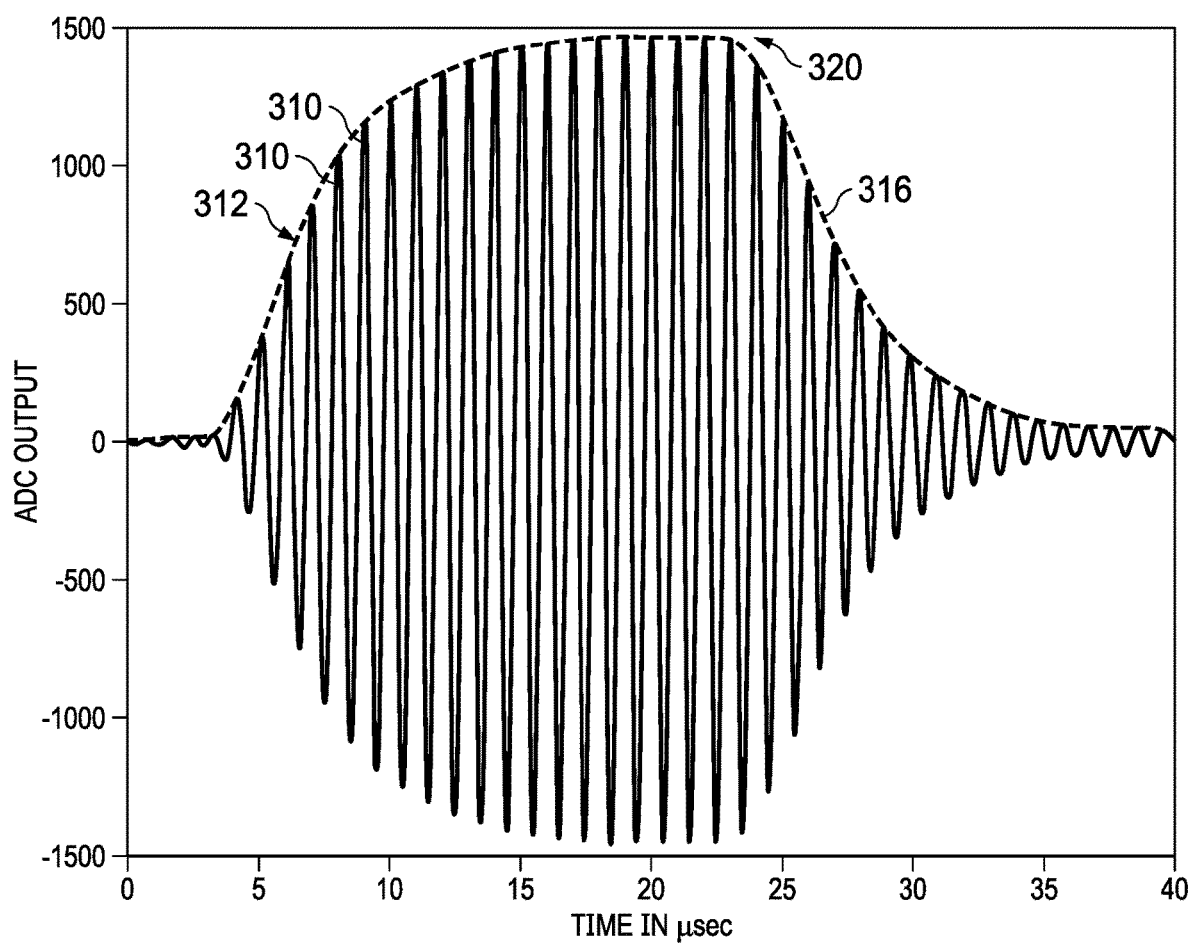
FIG. 3 shows an ultrasonic transducer waveform for a fluid with no gas bubbles.

When the UST circuit 104 uses a transducer to emit an ultrasonic signal, the UST circuit generates a series of pulses (a pulse train) at a frequency characteristic of ultrasound (e.g., 150-300 KHz). FIG. 3 shows an example of a pulse train. The pulse train includes a series of pulses 310 over the course of approximately 40 microseconds. The y-axis represents a digital code from an analog-to-digital converter (ADC) within the UST circuit 104 (the ADC is discussed below) that is the digital equivalent of the analog signal from one of the transducers 95, 98 which receives the pulse train generated by the other transducer. That is, one transducer generates the pulse train, and the other transducer receives the pulse train (after it passes through the fluid). The received pulse train is then converted to digital values as shown in FIG. 3. The magnitude of the pulses increases initially (312) to a maximum level 320, and then falls at 316. The initial increase in magnitude and the subsequent decrease is due to the limited bandwidth of the transducers themselves. The peak amplitude in the example of FIG. 3 is just under 1500 (1500 being a digital value from the ADC). The waveform of FIG. 3 illustrates a typical pulse train received by a transducer 95 or 98 with no gas bubbles. The peak amplitude (320) of each received pulse train is used as described below to estimate the volume of gas bubbles present in a fluid.

Figure 4:
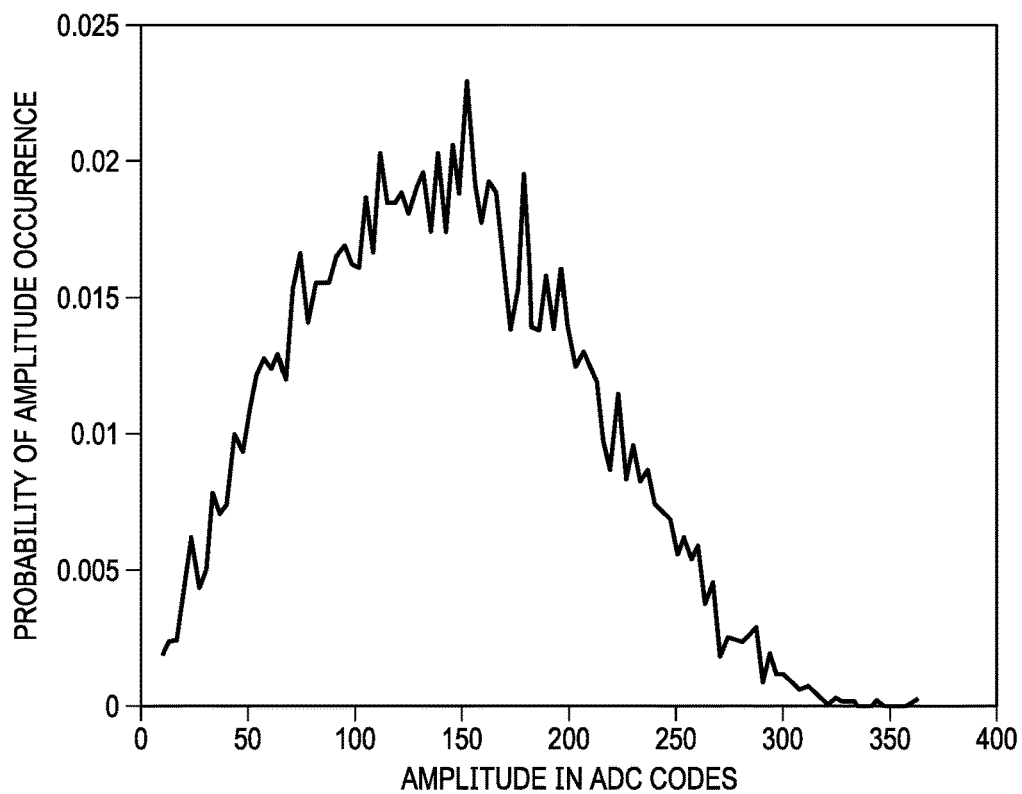
FIG. 4 shows an example of an ultrasonic transducer waveform of a fluid with gas bubbles illustrating that the standard deviation of the waveform is a function of the volume of gas bubbles in the fluid.

FIG. 4 shows an example of the ADC digital codes of the peak amplitude for each of multiple pulse trains when gas bubbles are present in the fluid whose flowrate is being measured. The x-axis is the digital code of the peak amplitude of each received pulse train and the y-axis is the probability of amplitude occurrence of each of the peak amplitudes. FIG. 4 represents a histogram of the peak amplitudes when gas bubbles are present. As can be seen compared to FIG. 3, the ADC codes are smaller when gas bubbles are present than with no gas bubbles. Further, the peak amplitude varies. In the example of FIG. 4, the range of ADC codes is 10 to 350. With no gas bubbles, there would be very little, if any, variation of the peak amplitudes from pulse train to pulse train.

The amount of variability is related to (e.g., monotonically related to) the volume of gas bubbles in the fluid. The variability of the peak amplitude is determined from the standard deviation of the peak amplitudes. A larger standard deviation means a larger volume of gas bubbles. For a given fluid and type of gas, a calibration curve can be determined apriori. Gas bubbles of a particular size or a predetermined volume of gas can be injected into a fluid and the mean and standard deviation of the peak transducer amplitudes are determined. For example, a gas diffuser can be used to introduce a controlled amount of gas to a fluid. This process is repeated for one or more different gas bubble sizes or desired gas volume amounts. In one example, a look-up table (LUT) 113 (FIG. 1) is created and stored in storage 106. The LUT 113 maps standard deviation values to volume of gas bubbles. In one example, the calibration and LUT creation and storage process may be performed prior to shipment of the flowmeter 100 to an end user. In other examples, the end-user can create and store the LUT 113 in storage 106.

During run-time, the UST circuit 104 receives signals from one or both of the transducers 95, 98, converts the received signals to digital form using an ADC, and then calculates the standard deviation of the peak values. The CPU core 102 compares the computed standard deviation to the LUT 113 and determines the volume of gas bubbles accordingly. In one example, the CPU core 102 may determine the closest standard deviation from LUT 113 to the computed standard deviation and then retrieve the gas bubble volume value form the LUT 113 corresponding to the closest standard deviation to that just calculated. The process of determining gas bubble volume may be repeated periodically (e.g., once per minute, once per hour, etc.). The resulting gas bubble volume values may be stored in storage 106 and read therefrom by an external device via a wireless or wired interface.

As noted above, ultrasonic signals are injected into the moving fluid in both directions—from transducer 95 to transducer 98 and from transducer 98 to transducer 95—when making a flowrate measurement. In one implementation, only the received signal from one of the transducers 95, 98 is processed to compute the standard deviation—that is, the received signals from a second transducer is not used.

With no gas bubbles in the fluid, the ADC peak digital value (derived from the receiving transducer 95, 98) should be fairly consistent from one measurement cycle to the next. Further, over the course of multiple measurements, the ADC peak digital value should remain relatively consistent.

Figure 5:
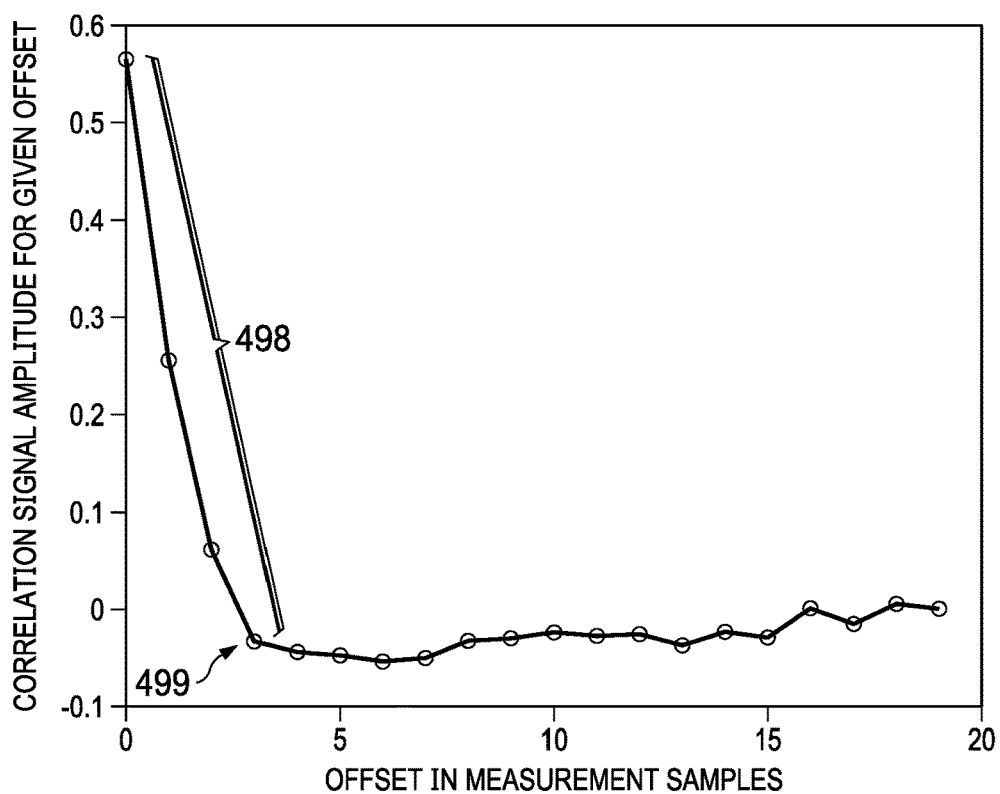
FIG. 5 shows another example of the time correlation across measurement offset of a fluid with gas bubbles.

FIG. 5 shows an example of the time correlation of the peak signal amplitude from an ADC/transducer with gas bubbles present in the fluid. The y-axis is the correlation of the peak amplitudes and the x-axis is the offset in measurement samples. For example, the correlation value for an offset of 5 means the correlation between two peak amplitude measurements spaced five measurements apart (i.e. one measurement n and another measurement n+5). As can be seen in the example curve of FIG. 5, the correlation between samples with a small offset (e.g., an offset of 1, that is, successive measurements) is greater than the correlation between samples with a larger offset (e.g., an offset of 10).

The decrease of the curve at 498 towards its lower correlation value at 499 is a function of the volume of gas bubbles. A sharper decrease in the falling portion 498 of the curve is characteristic of a larger volume of gas bubbles and a shallower decrease is characteristic of a smaller volume of gas bubbles. The relationship between the time correlation of a transducer signal and measurement offset thus can used to determine the volume of gas bubbles. As noted above, gas bubbles of a particular size (or a predetermined volume of the gas) can be injected into a fluid and the time correlation of the ADC's peak amplitude versus measurement offset relationship (such as that shown in FIG. 5) can be determined apriori. This process is repeated for one or more different gas bubble sizes/gas volume. In one example, LUT 113 is created and stored in storage 106. Rather than standard deviation values stored in LUT 113 as explained above, LUT 113 maps time correlation of the peak ADC output amplitudes versus measurement offset for different volumes of gas bubbles. In one example, the calibration and LUT creation and storage process may be performed prior to shipment of the flowmeter 100 to an end user. In other example, the end-user can create and store the LUT 113 in storage 106.

During run-time, the UST circuit 104 receives signals from one or both of the transducers 95, 98, converts the received signals to digital form using an ADC, and then determines the time correlation of the peak amplitudes of each received signal waveform (e.g., FIG. 3) for different offset values. The volume of gas in the fluid is determined by CPU core 102 using correlation-gas volume mapping stored in LUT 113. Let $R_u^k = \{r_u^k(1), r_u^k(2), \ldots, r_u^k(N)\}$ be the received upstream signal (e.g., as shown in FIG. 3) for the kth transmission. The designates the received ADC sample of an ADC value at time (i). In this case the CPU 102 calculates the peak of the received signal for the kth transmission given, that is, $\text{Rmax}_u^k = \max(r_u^k(1), r_u^k(2), \ldots, r_u^k(N))$.

Let the sequence $\{\text{Rmax}_u^{-\infty}, \ldots, \text{Rmax}_u^1, \text{Rmax}_u^2, \text{Rmax}_u^3, \text{Rmax}_u^k, \ldots, \text{Rmax}_u^\infty\}$ be the sequence of the peak of the received signals in the upstream direction. Then, the CPU 102 can compute the normalized correlation for l=0, 1, 2, 3, . . . for the upstream signal peaks per the equation below, $$\text{corr}(R\max_u(l)) = \sum_{i=-\infty}^{i=\infty} \left(R\max_u^k(i) - \text{mean}\left(R\max_u^k\right)\right)$$

$$\left(R\max_u^{k+l}(i) - \text{mean}\left(R\max_u^{k+l}\right)\right) \bigg/ \left(\sum_{i=-\infty}^{i=\infty} \left(R\max_u^k(i)\right)^2\right)$$

For l=0, the above equation corresponds to the normalized standard deviation of the amplitude of the received waveforms for the upstream direction. The downstream received signal can be denoted as $R_d^k = \{r_d^k(1), r_d^k(2), \ldots, r_d^k(N)\}$ and the CPU core 102 can compute the correlation and standard deviation for the downstream signal peaks. In some examples, the ADC output representing only the upstream or only the downstream direction is used to determine the correlation and standard deviation. In other cases, the ADC output for both directions is used. In this latter case, the resulting standard deviation from the upstream direction may be averaged with the standard deviation from the downstream direction.

Figure 6:
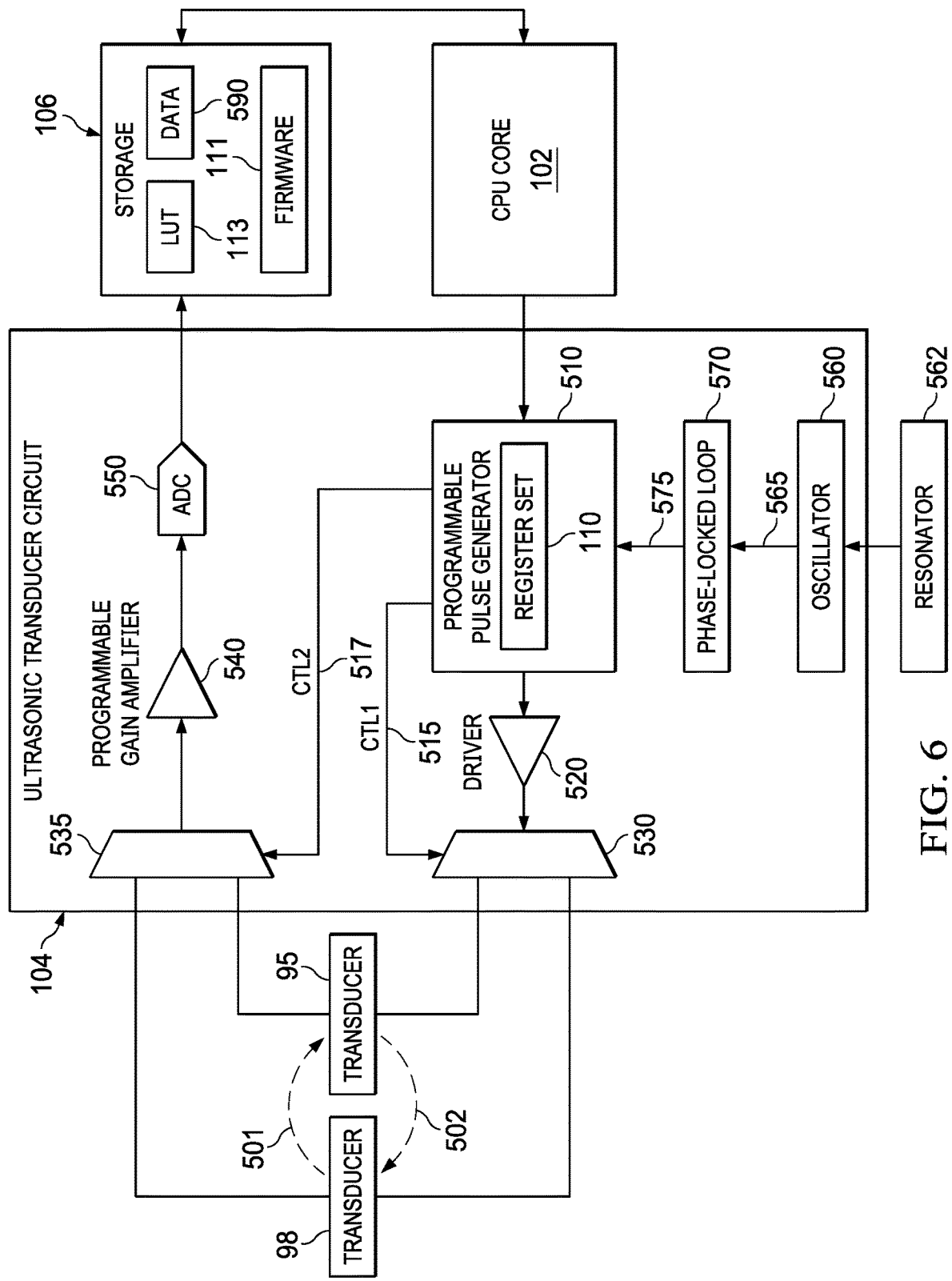
FIG. 6 shows an example of an ultrasonic transducer circuit usable to determine the volume of gas bubbles in a fluid.

FIG. 6 shows an example implementation of the UST 104 coupled to the CPU core 102, storage 106, and ultrasonic transducers 96 and 98. The UST circuit 104 in the example of FIG. 6 includes a programmable pulse generator (PPG) 510, a driver 520, multiplexers 530 and 535, a programmable gain amplifier (PGA) 540, an ADC 550, an oscillator 560, and a phase-locked loop (PLL) 570. The CPU core 102 programs the values defining the desired pulse train into register set 110, which is included in, or is accessible to, the PPG 510. The oscillator 560 generates a clock 565 based on a signal received from an external resonator 562. The external resonator may comprise a crystal resonator or a ceramic resonator. The clock 565 from oscillator 560 is provided as a reference clock to PLL 570 which, in turn, generates a clock 575 to the PPG 510. In some examples, the clock 575 generated by the PLL 570 is phase-locked to clock 565 but has a higher frequency than clock 565. For example, the frequency of clock 565 may be 8 MHz and the frequency of clock 575 may be in the range of 68 to 80 MHz.

The PPG 510 generates a pulse train using clock 575. The number of pulses of the pulse train and the frequency of the pulse train are dictated by the values written to register set 110 by the CPU core 102 (e.g., TU, TL, and the number of pulses). The resulting pulse train is provided to driver 520 which conditions the pulse train for driving one of the transducers 95, 98. The condition implemented by the driver 520 may include voltage level shifting, amplification, etc.

One of the transducers 95,98 is used to generate the ultrasonic signal with the other transducer functioning as the ultrasonic signal receiving transducer. Multiplexer 530 is configured by control signal CTL1 to select one of the transducers 95, 98 to receive the pulse train from driver 520. The PPG 510 in this example generates CTL1. The PPG 510 also asserts control signal CTL2 to configure multiplexer 535 to provide the electrical signal generated by the receiving transducer to the PGA 540.

The signal from the sensing transducer 95, 98 is provided through multiplexer 535 to PGA 540 where the signal is amplified. The amplified analog signal is then provided to ADC 550 which converts the amplified analog signal to a digital representation. In one implementation, ADC 550 includes a sigma-delta modulator (e.g., third order sigma-delta modulator). The resulting digital value is indicative of the amplitude of the signal received by the ultrasonic transducer and is stored in, for example, in storage 106 (data 590). The CPU core 102 can then read the digital values from data 590 of storage 106. The CPU core 102, executing firmware 111, may determine the standard deviation of the peak ADC values, the time correlation of the peak amplitudes across measurement offsets, or both. In the example of FIG. 6, the CPU core 102 uses the LUT 113 to determine the volume of gas bubbles in the fluid as explained above.

In one example, the volume of gas bubbles may be determined based on the standard deviation technique described above, and the volume of gas bubbles also may be determined based on the time correlation of the peak amplitudes across measurement offset technique described above.

The resulting gas bubble volume estimates then may be averaged together to provide a final gas bubble volume estimate. That is, the CPU core 102 determines a gas bubble volume estimate based on both the standard deviation and time correlation across measurement offset techniques.

Figure 7:
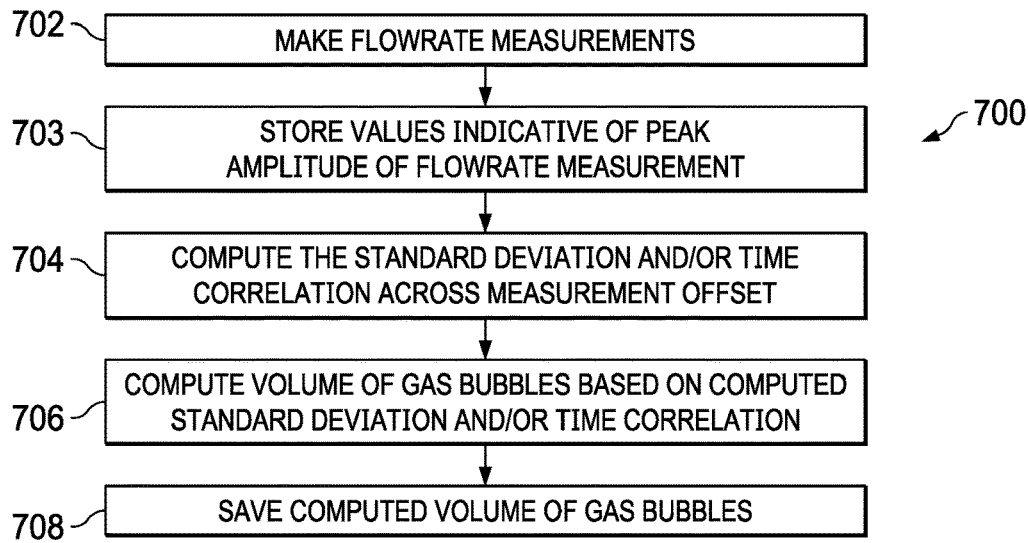
FIG. 7 shows an example of a method to determine the volume of gas bubbles in a fluid.

FIG. 7 shows an example method 700 implemented by the CPU core 102 of the flowmeter 100. At 702, the method includes making multiple flowrate measurements. Each measurement includes the CPU core 102 signaling the UST circuit 104 to use one of the transducers 95, 98 to emit an ultrasonic signal pulse train. The ADC 550 converts the signal from the receiving transducer to a digital representation and the resulting digital value is stored in data 590 of storage 106. At 703, the method includes for each (some or all) flowrate measurement, storing a digital representation indicative of the respective peak amplitude (e.g., peak of the example measurement waveform of FIG. 3) of each flowrate measurement in storage 106. The CPU core 102 determines the peak amplitude for each measurement.

At 704, the method includes using the stored digital peak amplitude representations to compute the standard deviation and/or the time correlation across measurement offset as explained above. At 706, the method includes computing (e.g., by the CPU core 102) the volume of gas bubbles based on the computed standard deviation and/or the time correlation of the peak amplitudes across measurement offset. At 708, the computed gas volume can be saved into storage 102 and can be subsequently read therefrom by an external device (i.e., external to the flowmeter 100).

The transducer signals can be used to measure flowrate and to determine the volume of gas in the fluid. That is, the transducer signals that are being used by the flowmeter 100 of the example FIG. 1 can be used to determine gas volume in addition to using such signals to determine flowrate.

Figure 8:
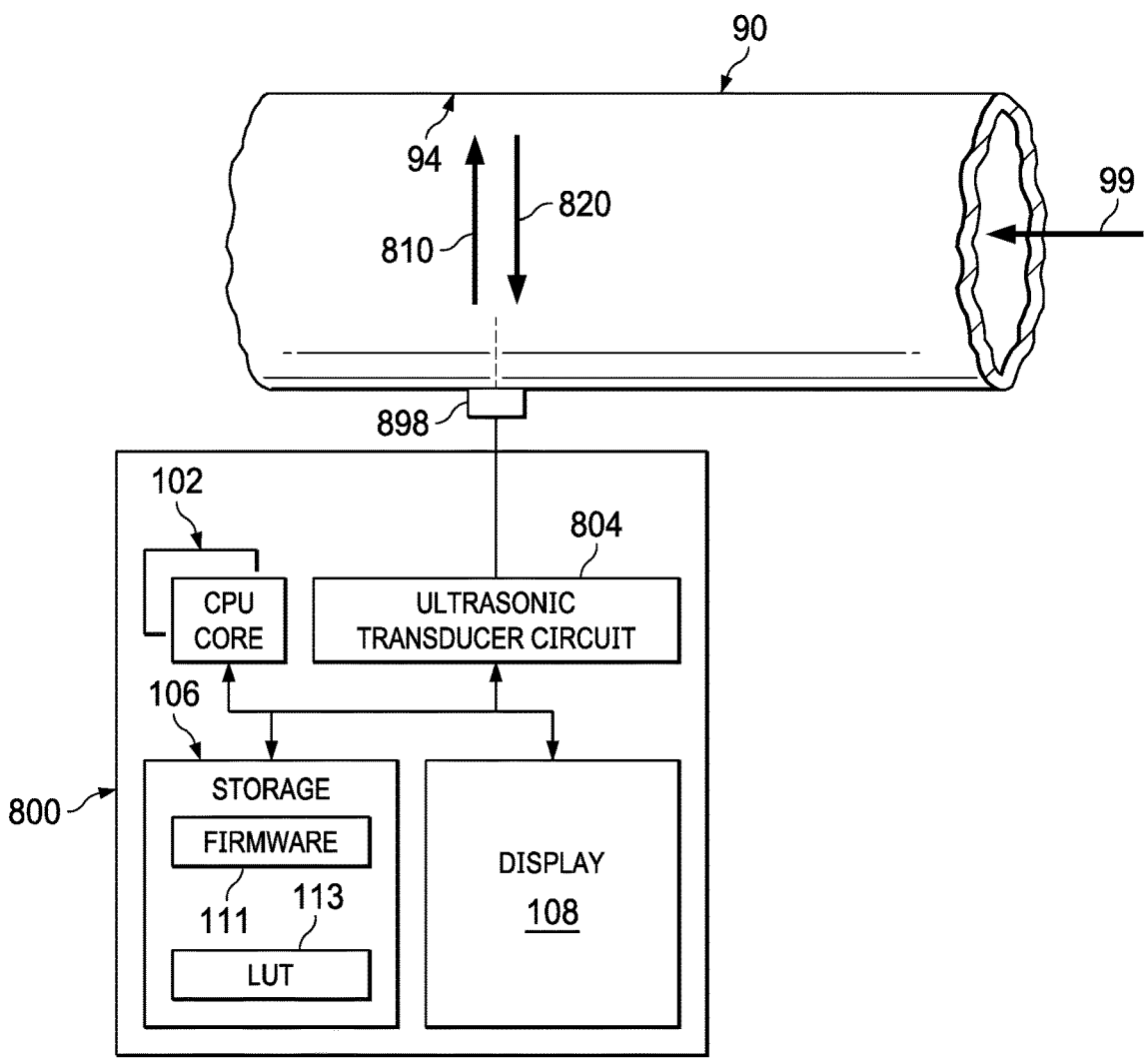
FIG. 8 shows another example of a metering system operable to determine gas volume in a fluid.

FIG. 8 shows an example of a metering system 800 that uses a single transducer 898 to determine gas volume. Because metering system 800 does not include two transducers, it does not determine flowrate. An ultrasonic transducer circuit 804 (the same or similar to ultrasonic transducer circuit 104) is included to cause transducer 898 to emit ultrasonic signals 810 and receive ultrasonic signals 820 reflected off of the opposite internal wall 94 of pip 90. The ultrasonic signals 810 and 820 propagate through the fluid generally normal to the direction 99 of fluid flow. The calculations described above are performed by the CPU core 102 within the metering system 800 to determine gas volume within the fluid.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method, comprising:
   receiving a first ultrasonic signal from a reflector, the first ultrasonic signal reflected by the reflector in a pipe configured to move fluid;
   determining a first amplitude based on the first ultrasonic signal;
   receiving a second ultrasonic signal from the reflector, the second ultrasonic signal reflected by the reflector in the pipe;
   determine a second amplitude based on the second ultrasonic signal;
   compute a time correlation of the first amplitude and the second amplitude; and
   determine, based on the time correlation, a value indicative of a volume of gas bubbles in the fluid.

2. The method of claim 1, further comprising: computing a standard deviation of amplitudes, and wherein determining the value indicative of the volume of gas bubbles in the fluid is further based on the standard deviation.

3. The method of claim 2, wherein determining the value indicative of the volume of base bubbles is based on an average of the time correlation.

4. The method of claim 2, further comprising:
   determining a first estimate of the volume of gas bubbles based on the computed standard deviation;
   determining a second estimate of the volume of gas bubbles based on the computed time correlation; and
   determining the value indicative of the volume of gas bubbles based on the first and second estimates of the volume of gas bubbles.

5. The method of claim 1, further comprising: determining a flowrate of the fluid.

6. The method of claim 1, further comprising:
   determining a set of peak amplitudes by determining a peak amplitude for each pulse train by a first ultrasonic transducer or a second ultrasonic transducer; and
   computing the time correlation of the set of peak amplitudes.

7. The method of claim 6, wherein computing the time correlation comprises determining a relationship between the set of amplitudes and each measurement offset.

8. The method of claim 1, wherein receiving the first ultrasonic signal comprising receiving the first ultrasonic signal by a first ultrasonic transducer or a second ultrasonic transducer.

9. The method of claim 1, further comprising:
   generating a third ultrasonic signal to be reflected by the reflector as the first ultrasonic signal; and
   generating a fourth ultrasonic signal to be reflected by the reflector as the second ultrasonic signal.

10. A system, comprising:
    a pipe configured to move fluid;
    a first ultrasonic transducer configured to generate a first ultrasonic signal and a second ultrasonic signal to transmit through the fluid, wherein a reflector causes the first or a second ultrasonic transducer to receive the first ultrasonic signal, and wherein the reflector causes the first or second ultrasonic transducer to receive the second ultrasonic signal; and
    a controller configured to:
    determine a first amplitude based on the received first ultrasonic signal;
    determine a second amplitude based on the received second ultrasonic signal;
    compute a time correlation of the first amplitude and the second amplitude; and
    determine, based on the time correlation, a value indicative of a volume of gas bubbles in the fluid.

11. The system of claim 10, wherein the controller is further configured to:
    compute a standard deviation of a set of amplitudes; and determine, based on the time correlation and further based on the standard deviation, the value indicative of the volume of gas bubbles in the fluid.

12. The system of claim 11, wherein the controller is further configured to:
   determine a first estimate of the volume of gas bubbles based on the computed standard deviation;
   determine a second estimate of the volume of gas bubbles based on the computed time correlation; and
   determine the value indicative of the volume of gas bubbles based on the first and second estimates of the volume of gas bubbles.

13. The system of claim 11, wherein the controller is configured to determine the value indicative of the volume of gas bubbles in the fluid based on an average of the time correlation and the standard deviation, the value indicative of the volume of gas bubbles in the fluid.

14. The system of claim 10, wherein the controller is configured to determine a flowrate of the fluid.

15. The system of claim 10, wherein the controller comprises a memory having a look-up table (LUT) configured to map time correlation values with gas volume values.

16. The system of claim 15, wherein the controller is configured to determine the value indicative of the volume of gas bubbles in the fluid using the LUT.

17. The system of claim 10, wherein the controller is further configured to:
   determine a set of peak amplitudes by determining a peak amplitude for each pulse train; and
   compute the time correlation of the set of peak amplitude.

18. The system of claim 17, wherein the controller is further configured to compute a relationship between the set of peak amplitudes and each measurement offset.

19. The system of claim 10, further comprising: the second ultrasonic transducer.

* * * * *